US010232282B2

(12) United States Patent
Joseph (10) Patent No.: US 10,232,282 B2
(45) Date of Patent: Mar. 19, 2019

(54) DISPLAY SYSTEM FOR TRANSFORMING SUNLIT SURFACES

(71) Applicant: DISNEY ENTERPRISES, INC., Burbank, CA (US)

(72) Inventor: Daniel M. Joseph, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 224 days.

(21) Appl. No.: 15/372,858

(22) Filed: Dec. 8, 2016

(65) Prior Publication Data

US 2018/0161691 A1    Jun. 14, 2018

(51) Int. Cl.
| *G02F 1/1347* | (2006.01) |
| *A63J 1/02* | (2006.01) |
| *A63J 5/02* | (2006.01) |
| *G02F 1/13* | (2006.01) |

(52) U.S. Cl.
CPC .. *A63J 1/02* (2013.01); *A63J 5/02* (2013.01); *G02F 1/1313* (2013.01); *G02F 1/13471* (2013.01); *G02F 1/13476* (2013.01)

(58) Field of Classification Search
CPC .......................... G02F 1/13471; G02F 1/13476
See application file for complete search history.

(56) References Cited

U.S. PATENT DOCUMENTS

| 6,072,549 A * | 6/2000 | Faris .................... B82Y 15/00 349/16 |
| 8,767,145 B1 * | 7/2014 | Zhang ................ G02F 1/13471 349/114 |
| 8,913,215 B2 * | 12/2014 | Yang .................. G02F 1/13718 349/16 |
| 9,063,358 B2 * | 6/2015 | Li ............................. B60J 3/04 |
| 9,701,577 B1 * | 7/2017 | Simmons ......... G02F 1/133365 |
| 10,025,150 B2 * | 7/2018 | Igarashi ............... G02F 1/1334 |
| 2003/0193709 A1 * | 10/2003 | Mallya .................. G02F 1/1334 359/245 |
| 2005/0073534 A1 * | 4/2005 | Lee .......................... G09F 9/35 345/87 |
| 2010/0066928 A1 * | 3/2010 | Pelfrey ................ G02F 1/1334 349/16 |

(Continued)

*Primary Examiner* — Phu Vu
(74) *Attorney, Agent, or Firm* — Marsh Fischmann & Breyfogle LLP; Kent A. Lembke (57) ABSTRACT

A display system for transforming sunlit and other brightly lit surfaces while being observed by viewers or an audience. The display system includes an optical element switchable between first and second operating states, and the optical element includes a pane that is opaque in the first operating state and transparent in the second operating state. The display system includes a controller operable to switch the optical element between the first and second operating states. Further, the display system includes a background image element positioned adjacent to a first surface of the pane of the switchable optical element. The pane may be a liquid crystal (LC) film, and the controller operates a power source to provide electric current to the LC film to switch the optical element to the second operating state. The display system may include a foreground image element positioned proximate to a second surface of the pane.

16 Claims, 6 Drawing Sheets

(56) References Cited

U.S. PATENT DOCUMENTS

| | | | |
|---|---|---|---|
| 2010/0294679 A1* | 11/2010 | Griffiths | A47F 3/005 206/242 |
| 2013/0300728 A1* | 11/2013 | Reichow | G09G 3/36 345/419 |
| 2014/0192281 A1* | 7/2014 | Smithwick | G02F 1/1313 349/15 |
| 2015/0253895 A1* | 9/2015 | Kim | G06F 3/044 345/174 |
| 2016/0197131 A1* | 7/2016 | Park | H01L 27/3267 349/139 |
| 2016/0220039 A1* | 8/2016 | Chang | A47F 3/043 |
| 2016/0363806 A1* | 12/2016 | Sinderbrand | G02F 1/133308 |
| 2017/0010218 A1* | 1/2017 | He | G02F 1/172 |
| 2017/0027339 A1* | 2/2017 | Chang | A47F 3/043 |
| 2017/0041598 A1* | 2/2017 | Smithwick | G09G 3/3406 |
| 2017/0075314 A1* | 3/2017 | Perez-Feliciano | G04G 9/0064 |
| 2017/0089632 A1* | 3/2017 | Kang | G09F 9/35 |
| 2017/0153379 A1* | 6/2017 | Chang | G02B 6/0081 |
| 2018/0141414 A1* | 5/2018 | Lota | B60J 3/04 |
| 2018/0252978 A1* | 9/2018 | Feng | G02F 1/1333 |

\* cited by examiner

DISPLAY SYSTEM FOR TRANSFORMING SUNLIT SURFACES

BACKGROUND

1. Field of the Description

The present description relates, in general, to theatrical and other display sets and surfaces and, more particularly, to display systems for transforming or changing surfaces in a theatrical or other entertainment setting in a rapid and effective manner even when those surfaces are well lit or highly illuminated such as walls of an outdoor structure exposed to direct sunlight.

2. Relevant Background

In the entertainment, marketing, and other industries, there are many situations in which it is desirable to have a surface change over time and, in some cases, in a very short period of time. For example, a theatrical stage typically will include sets and backdrops that are intended to define a space, and it may be desirable to change these sets between scenes or acts or even during a scene while the lights remain "up" such that these surfaces are well lit. In outdoor settings such as in a theme park, a world or town may be defined by many structures such as building walls, and it may be desirable to have these surfaces changed over time to reflect activities in a show such as when a character writes on a wall, when a futuristic battle occurs with laser shots hitting walls, when a magical character or superhero casts a spell or uses their superpowers to transform a wall, and so on.

Further, in the amusement or theme park environment, many of the attractions have buildings that are very rich in texture and finish. These textures and finishes may be provided on walls and other surfaces of an attraction's queue and also on exterior surfaces that are exposed to bright lighting including receiving direct sunlight. Many operators of amusement and theme parks (and other providers of outdoor displays) have wanted the ability to do close up changes and transformations to these surfaces, even those with rich and detailed textures and finishes, and it is has been desirable for these transformations to occur right before a viewer's eyes and when the surfaces are illuminated (e.g., not when lights are lowered between scenes or by hiding the surface during the transformation).

Recently, transformations of these texture and finish rich (and other) surfaces has been performed using projectors. The projector's content may be changed to vary a projected finish or texture of a wall, for example, or a surface that had not previously been projected upon may suddenly be used as a projection surface to provide a visual transformation of a surface (such as a building wall) in real time. This visual effect is typically achieved through the use of projection mapping or similar techniques.

Projection-based transformation has proven useful in many low light settings such as along the tracks or path of an indoor ride at an amusement or theme park or on a theatrical stage where lighting can be tightly controlled. Unfortunately, projection-based surface transformation (including projection mapping versions) does not work well in a daylight exterior situation. A major problem with projection in outdoor environments is that the projector has to combat and overcome the brightness of the Sun. In other cases, projection-based solutions to surface transformation are problematic because viewers (e.g., park visitors or guests) are allowed to be in contact or in close proximity with the surface that is to be transformed, and this nearby positioning of the viewers of the display often will result in the viewers shadowing or blocking the projected light such that the transformation effect is diminished or even ruined.

SUMMARY

Briefly, the inventor recognized that there are a number of problems with the use of projected light to transform exterior surfaces and other surfaces that may be brightly lit during the desired texture or finish transformation. The display systems or assemblies of the present description are particularly well suited for use in outdoor settings as well as in theatrical and other environments where projection-based transformations or changes of a surface may not be effective or desirable such as where it is desired to change a surface without dropping or modifying the lighting levels. In many embodiments, the display systems are configured to provide visual effects using reflected light rather than using emissive techniques.

To this end, the inventor discovered that a display system (or assembly) can be created that effectively utilizes a film or optical element that is able to be switched from a transparent (or at least translucent) state to an opaque state (with "opaque" herein being intended to mean significantly more light blocking than the transparent state such as with a milky or fogged appearance). In some embodiments, the switchable film or optical element takes the form of commercially available liquid crystal (LC) film that is configured to be switched or turned from clear to opaque when electrical current is provided to it and removed from it, respectively (or to switch from its clearer or more transparent state when turned "on" to its less clear or more opaque state when turned "off"). A rigid pane of LC glass may be used, but many applications utilized a flexible and relatively thin sheet of the LC film for the switchable film or optical element.

In some implementations, the display system includes a pane or sheet of the switchable film combined with an image element (also called a first image element or background image element) that is positioned on or against one side of the pane/sheet of switchable film (such as against or on the rear or inward facing side of the switchable film). The image element may be a layer of ink or other material printed directly onto or applied onto the side (or surface) of the pane/sheet of switchable film. In other cases, the image element is provided as a substrate (or another sheet/pane of material) upon which an image has been printed or formed. In still other cases, the image element may take the form of a daylight-viewable display device such as an liquid crystal display (LCD) screen that is positioned near and facing the side (or surface) of the pane/sheet of switchable film.

Optionally, a foreground image element (also called a second image element) may be placed on or against (or near) the other or second side of the pane/sheet of the switchable film (such as against or on the front or outward facing side of the switchable film). In some cases, a transparent or similar ink is printed upon this exterior or second side of the switchable film to provide the foreground image element. The switchable film is viewable through all or a portion of this foreground image element which may be wholly or partially translucent (to transparent) and include a texture or finish suitable for the particular surface.

During operations, the display system may be switched between first and second operating states such as with a controller in the display system selectively providing power (or current) to the switchable film. In the first operating state, it may be desirable for the switchable film to be opaque (or at least in its milky or light-blocking state), and the controller operates to turn off the power source for the switchable film. In the first operating state, the switchable film is opaque or appears milky/fogged, and the first or background image element is not visible through the switchable film and, optionally, through the second or foreground image element. In the first operating state, the display system, which can be provided as part of a wall of an outdoor display or structure, part of a theatrical set, and so on, displays the imagery provided by second or foreground image element, e.g., the surface has a first texture or finish that matches the nearby portions of this wall or structure.

In the second operating state, the switchable film become transparent or allows a significantly larger amount of light to pass, and the first or background image element becomes visible through the switchable film and, optionally, through the second or foreground image element. In this second operating state, the surface of the wall or structure provided by the display element is magically transformed (right in front of a viewer's eyes) to have a new texture or finish provided by the imagery printed upon or provided by the first image element (e.g., to have its normal texture or surface scarred by a laser blast, to show painting or writing by a character, to change colors, and so on).

More particularly, a display system is provided that is particularly useful for transforming sunlit and other brightly lit surfaces in real time or while being observed by viewers or an audience. The display system includes an optical element switchable between first and second operating states, and the optical element includes a pane (or sheet or film) that is substantially opaque in the first operating state and substantially transparent in the second operating state. The display system includes a controller operable to switch the optical element between the first and second operating states. Further, the display system includes a background image element positioned adjacent to a first surface of the pane of the switchable optical element.

In some embodiments, the pane is a liquid crystal (LC) film, and the controller operates a power source, which may be part of the display system, to provide electric current to the LC film to switch the optical element to the second operating state. In the same or other embodiments, the display system also includes a foreground image element positioned proximate to a second surface of the pane opposite the first surface of the pane (e.g., abutting and parallel to the pane's first surface). In such embodiments, the foreground image element may include a transparent substrate with a first surface facing the second surface of the pane and a second surface facing away from the pane.

An image layer may then be applied to the second surface of the transparent substrate. The image layer of the foreground image element may take the form of a layer or thickness of transparent ink applied to (or printed upon) the second surface of the transparent substrate. In these embodiments, the display system may include a support structure with an exposed surface, and the foreground image element can be mounted on the support structure with the second surface of the transparent substrate coplanar with the exposed surface of the support structure.

In some embodiments, the background image element includes a printed graphic or bas relief on a substrate positioned to face the optical element. In other cases, the background image element includes a layer of ink printed or applied to the first surface of the pane. In still other cases, the background image element takes the form of a 2D or 3D object (e.g., a theatrical prop or the like). In some embodiments, the background image element is an emissive display device such as a daylight-viewable (higher illumination output) LC display.

DETAILED DESCRIPTION OF THE PREFERRED EMBODIMENTS

Briefly, a display system or assembly is described that is useful for transforming a surface even when that surface is fully illuminated or well lit. For example, the surface may be a portion of an exterior wall, a portion of a flat on a theatrical set, and so on, and the display system (or at least several of its components) may be mounted on or configured to provide a portion of the surface that is to be transformed.

Numerous embodiments and variations of the display system will become apparent to those skilled in the art once the general concepts of the system are explained. With this in mind, though, it may be useful to provide one useful example of the inventor's display system. In an exemplary embodiment, the display system utilizes an off-the-shelf LC film, which is a material that turns clear with electrical current and opaque when the current is turned off. The LC film was modified by printing upon it, such as with a transparent ink, to provide a foreground image element (or second image element). The printed-upon LC film (or a pane or sheet of such LC film) is then embedded into a wall or other structure such as into an over layer printed/sculpted/theme-painted texture exterior surface that is used in an entertainment setting (e.g., an exterior wall of a building in a theme park world or town, a flat of a theatrical set, and so on).

Then, a print or low bas relief is placed behind the embedded LC film to provide the background or first image element. For example, a substrate or sheet with the print or low bas relief is placed to abut or be near to the inward-facing or rear side of the LC pane/sheet opposite the foreground or second image element. In one prototype, the supporting wall or structure was an exterior wall of a building in a futuristic village or world in which a laser battle is to occur. The background or first image element is configured to provide imagery or a graphic that looks like a scorched burn mark on concrete that would occur if a laser blast strikes the exterior wall. In the first operating state of the display system, the concrete or other textured wall appears undamaged with the embedded and printed-upon LC film is non-activated or turned "off" (with no electrical current fed to the film via a power/current source) as the LC film is opaque and the background or first image element remains hidden or not viewable by a person observing the exterior wall's surface.

In the second operating state of the display system, the LC film is activated, and the surface of the exterior wall appears to get a scorched area as the background or first image element becomes visible through the now transparent LC film (and through all or a portion of the foreground or second image element). There are no moving parts in this display system so that it is a solid state and safe design. The illusion provided by the display system can easily be seen in direct sunlight or when the surface is well lit (highly illuminated) since the liquid crystal and printed first/background image element are reflective (or it is a reflective effect) rather than relying on projection or other techniques that are emissive.

Figure 1A:
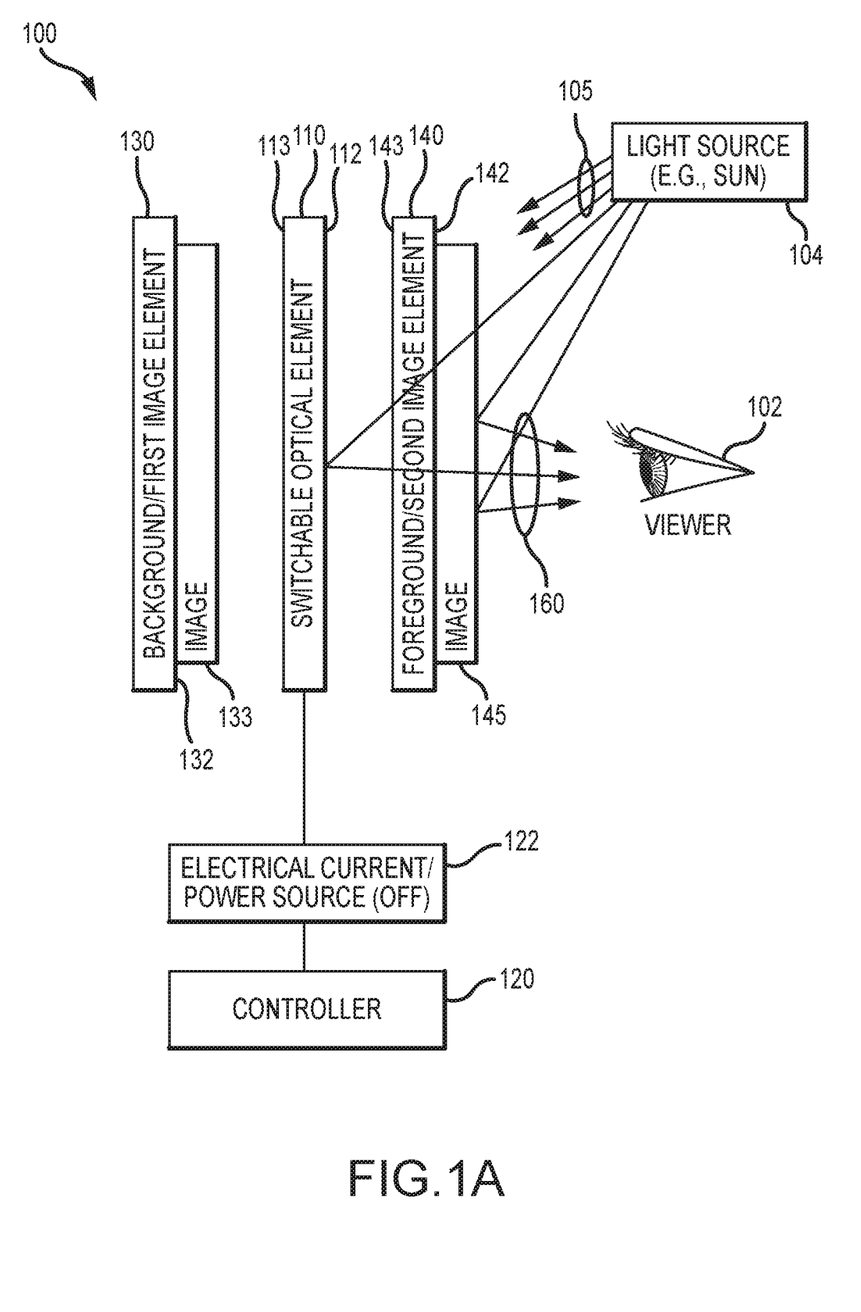
FIGS. 1A and 1B are functional block diagrams of a display system of the present description in its first and second operating states.
Figure 1B:
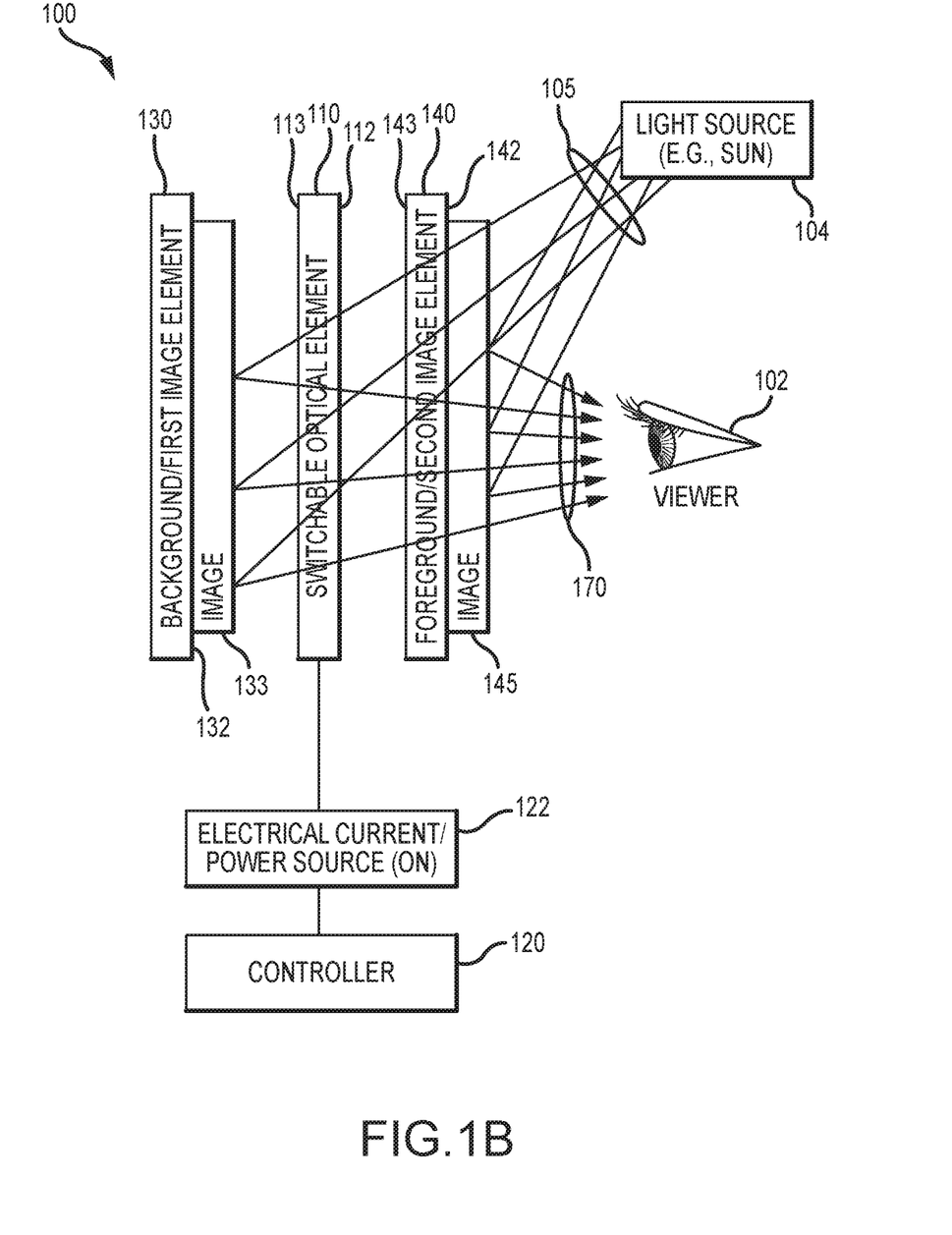

FIGS. 1A and 1B illustrate, with a functional block diagram, a display system (or assembly) 100 of the present description in its first and second operating states, respectively. The display system 100 is shown to include a switchable optical element 110, which as discussed above may take the form of a sheet or pane (e.g., up to a 4 foot by 4 foot or larger section) of LC film adapted to be switched from an opaque state to a transparent or clear state. The switchable optical element 110 has a first or outward-facing (or exterior) surface 112 facing a viewer 102 and exposed to a light source 104, which may provide light 105 of a higher illumination level such as sunlight when the source 104 is the Sun or theatrical lighting in other cases. The optical element 110 also includes an opposite second or inward-facing (or interior) surface 113 facing away from the viewer 102 and the light source 104. The optical element 110 may be arranged to be planar such as when it is embedded into or placed on a planar surface such as side of a wall or the optical element 110 may be arranged to have an arcuate (or cylindrical) shape (e.g., the optical element 110 may be formed from a flexible LC film allowing it to conform to a surface's particular shape and contours).

As shown, a controller 120 is included that may take the form of a computer or other electronic device with a processor(s) and software to allow it to generate control signals for turning the switchable optical element 110 off and on (or between a first operating state as shown in FIG. 1A and a second operating state as shown in FIG. 1B). Specifically, the control signals are transmitted to an electric current and/or power source 122 to cause it to switch between providing no electric current/power to the optical element as shown in FIG. 1A and providing electric current/power to the switchable optical element 110. In the first operating state or off/no current mode shown in FIG. 1A, the optical element 110 is opaque while in the second operating state or on/current received mode shown in FIG. 1B the optical element 110 is clear/transparent. Typically, the switching time is very short such as less than 1 second and more typically a small fraction of a second such that the switching between operating states of FIGS. 1A and 1B for the display system 100 is not perceptible to the human viewer 102.

The display system 100 is also shown to include a background or first image element 130 with a side or surface 132 that is facing the inner surface 113 of the optical element. There may be a space between these components or the first image element's surface 132 may be abutting the surface 113 of the optical element 110 or the first image element 130 may be formed or printed directly on the surface 113. On the surface 132, an image or ink layer 133 may be provided (or this ink/image layer may be printed directly on the surface 113 in some cases) on the surface 132 such as when the image element 130 includes a transparent or opaque substrate (e.g., a sheet of plastic or glass, a sheet of paper, or the like).

Further, the display system 100 optionally includes a foreground/second image element 140, which may be a transparent substrate or film (e.g., of glass, ceramic, or plastic) with an inner surface 143 facing the optical element's exterior surface 112 and with an outer surface 142 facing the viewer 102 and receiving the light 105 from the light source 104. An image element or ink layer 145 (e.g., a transparent ink or the like) is printed or applied (or otherwise formed) on the outer surface 142 of the image element 140 (or the image element 140 may be made up of a transparent ink that is printed directly on the surface 112 of the optical element 110). As with the first image element 130, the second image element 140 may be spaced apart some distance from the optical element 112 or be in abutting contact with or formed upon the surface 112 of the optical element 110. The first and second image elements 130, 140 may be planar and arranged parallel to the optical element 110 or it may be arcuate or otherwise contoured shaped to match (or differ from) the cross sectional shape of the switchable optical element 110.

During operations, the controller 120 as shown in FIG. 1A operates the display system 100 in the first operating state such that the image 133 provided by the first image element 130 is not visible to the viewer 102. Particularly, the effect is a reflective effect and no (or little) light is reflected to the viewer 102 from the exterior light source 104. This can be seen in FIG. 1A with the light 105 from the source 104 striking and being reflected as shown at 160 from the foreground or second image element's surface 142 such that the image 145 is visible or viewable by the viewer 102. This may be a texture or finish that matches a surrounding or supporting wall's surface (as the display system 100 may be embedded in or attached to a structure (not shown) such as a wall of building, a flat of a set, and so on). Concurrently, the optical element 110 is operated by the controller 120 to be "off" or with no (or little) current provided by the source 122, and this causes the optical element 110 to be opaque (or at least to block a relatively larger amount of light compared with its transparent/clear state shown in FIG. 1B). As a result, light 105 from the source 104 passes through or at least through a portion of the ink/image layer 145 where it is reflected back as shown at 160 from the surface 112 of the now-opaque optical element 110. In the first operating state of FIG. 1A, the display system 100 is operated to mainly display the imagery provided by the ink or image layer 145 of the second or foreground image element 110.

Then during a second operating period, the controller 120 operates as shown in FIG. 1B the optical element 110 in a second operating state to be transparent (or to pass a significantly larger amount of light than when in the first or opaque state of FIG. 1B). For example, the optical element 110 may be a sheet or pane of LC film, and the source 122 may be operated by the controller 120 to provide electric current to the optical element 110 to switch it from opaque (or milky/fogged) to transparent. In this operating state, light 105 from the exterior source 104 is still (to some extent) reflected from the ink/image layer 145 of the second image element 140 to cause the image 145 to be visible as reflected light 170. However, much or all of the light 105 may pass through the foreground image element 110 that is adjacent or covering the optical element 110, which is transparent/clear. Hence, the light 105 continues through the optical element 110 to strike and be reflected from the ink/image layer 133 of the first image element 130 and back to the viewer 102 as shown at 170 such that the imagery provided by the background/first image element 130 is visible or viewable to the viewer 102.

FIGS. 2A-2D illustrate an exemplary embodiment of a display system or assembly 200 that is useful for embedding within or on a wall or other structure to magically transform its exposed or exterior surface. The display system 200 is not shown in whole for simplicity of description as it typically will also include a power/current source which may be controlled in a wired or wireless manner via a controller (as shown in FIG. 1 with display system 100). The structure may be a building or other wall having a particular texture or finish such as concrete, brick, or the like of a particular color.

To facilitate the display system 200 being embedded in this structure, the display system 200 includes a foreground image element 210 (also labeled second image element in FIG. 1 as it is optional for some display systems) that includes a substrate (pane or sheet of material) 212 with a first or exterior surface 213 (outward facing) and a second or interior surface 215 (inward facing). When installed, the exterior surface 213 is exposed to light (such as from the Sun or other light sources) and reflects light to nearby viewers. In use, the substrate or pane 212 would be embedded within or mounted on a structure such as a wall, e.g., with the exterior surface 213 coplanar with the surface of the wall or structure to be transformed.

The substrate 212 may take a variety of forms to practice the system 200 with one useful embodiment utilizing a translucent to transparent/clear pane of material such as glass, plastic, ceramic, acrylic glass (such as Plexiglass™), fiberglass, or the like. To provide imaging or images that match the finish or texture of the nearby structure, the foreground image element 210 also includes an image layer 216 such as a layer of ink when an image is printed on the surface 213 of the foreground image element 210. In some embodiments, the ink used for image layer 216 is chosen to be a transparent ink while in some embodiments the ink/image layer 216 will include a gap or hole coinciding with the location, size, and shape of the background image element 220 in which no ink (or other printed/formed material) is applied to the surface 213). In both these ways, the background image element 220 is visible to a viewer through the image layer 216 and the substantially transparent substrate 212 (e.g., through the foreground image element 210).

Figure 2A:
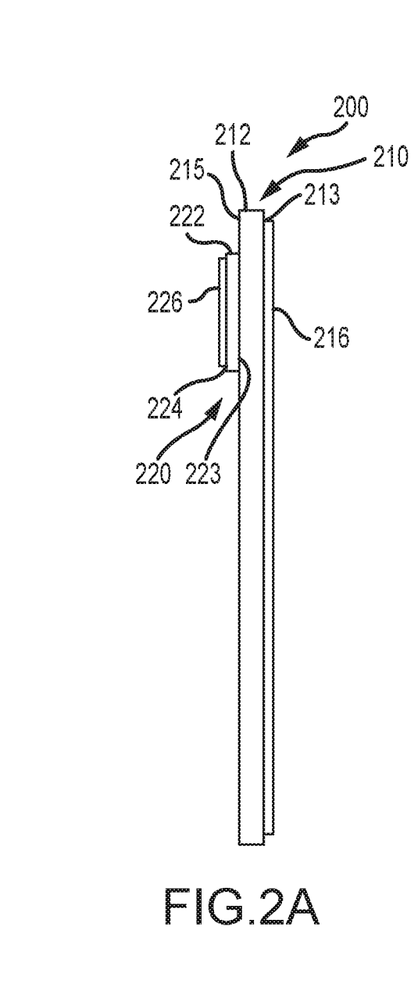
FIGS. 2A-2D illustrate a portion of an exemplary display system or assembly of the present description such as may be used for embedding on a wall or other structure to transform its exposed or exterior surface.
Figure 2B:
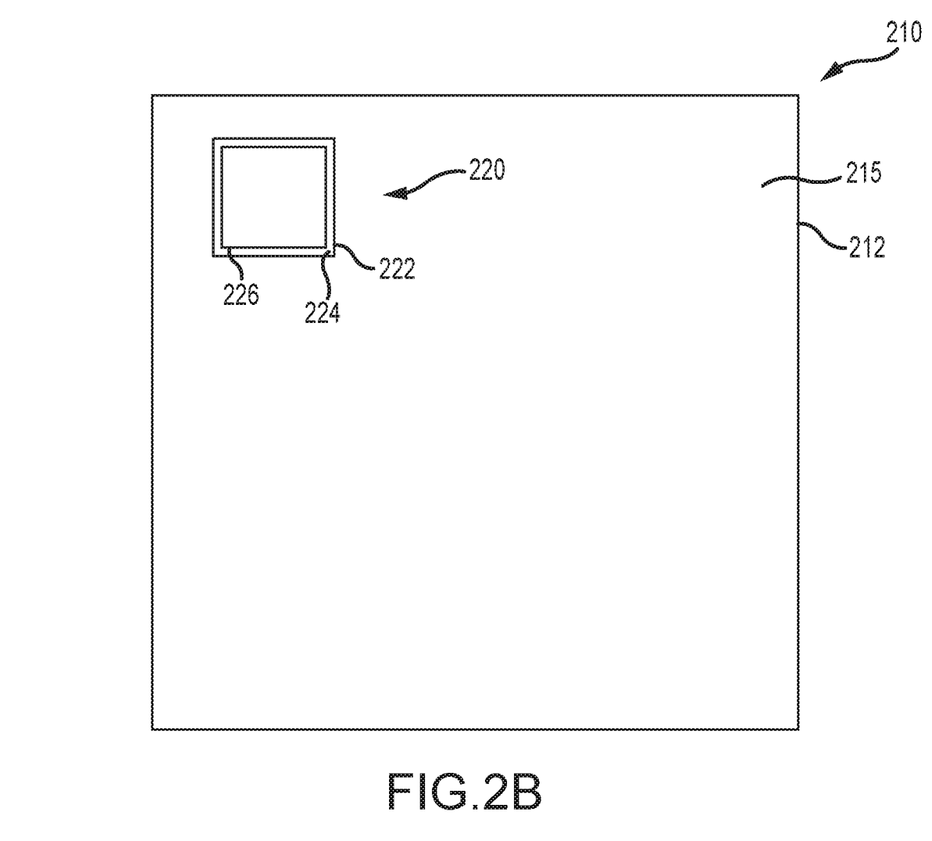

The display system 200 further includes a switchable optical element 220 and a background image element 226 (or first image element as labeled in FIG. 1). As shown in FIGS. 2A and 2B (which are side and rear views of the display system 200), these two components 220 and 226 are smaller than the foreground image element 210 and sized, shaped, and located (relative to the image layer 216) to coincide with a portion of the foreground image element 210 that is to be transformed or changed during operations of the display system 200. As shown, the switchable optical element 220 includes a film or pane 222 that is rectangular in shape (but other shapes may be used) with a first side facing and, in this non-limiting example, abutting the interior surface 215 of the substrate 212 of the foreground image element 210. A second side 224 of the film/pane 222 faces away from the foreground image element 210, and a background image element 226 is, in this example, applied to this surface/side 224.

The switchable optical element 220 and background image element 226 may take a variety of forms to practice the display system 200. In one prototyped embodiment of display system 200, the switchable optical element 220 includes a film/pane 222 of LC material or film adapted to turn clear with electrical current and be opaque with the current off (or with no/little electrical current). The background image element 226 may be an ink or other material applied to the LC film/pane 222 or, as in the prototyped system 200, the background image element 226 may take the form of a print or low bas relief that is placed behind the LC pane/film 222 (e.g., spaced apart some distance or, as shown, to mate with or abut the surface/side 224 of the LC film/pane 222). When the LC pane/film 222 is off, the background image element 226 is not visible or viewable through the LC pane/film 222, and, when the LC pane/film 222 is on (electric current supplied to the LC pane/film 222), the background image element 226 is visible or viewable via reflected light from an exterior light source (such as the Sun or stage/theatrical lighting) to a viewer observing the display system 200 from the exterior side/surface 213 of the foreground image element 210.

Figure 2C:
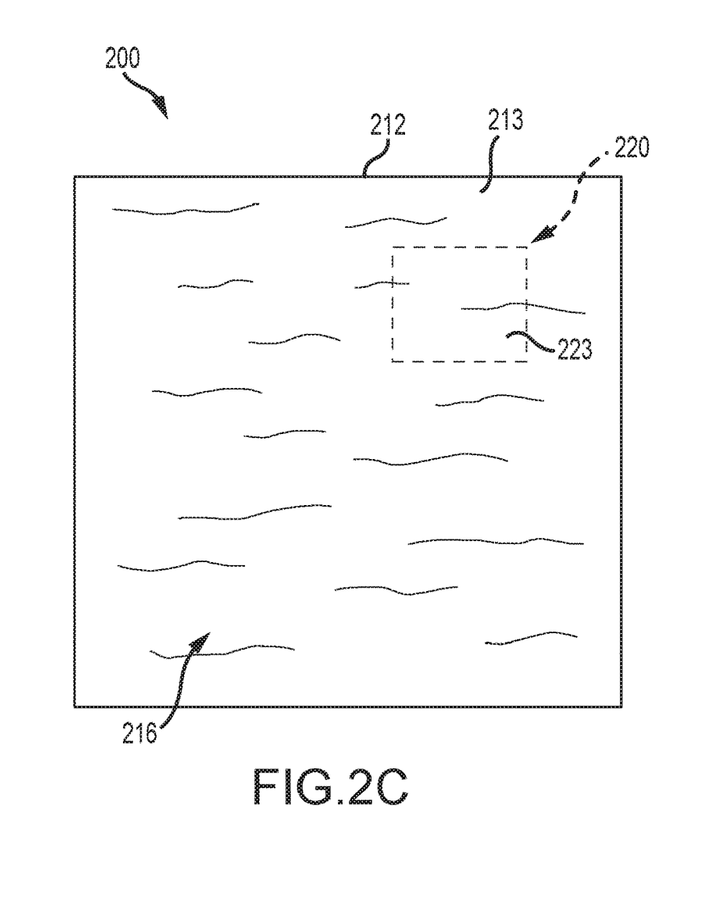
Figure 2D:
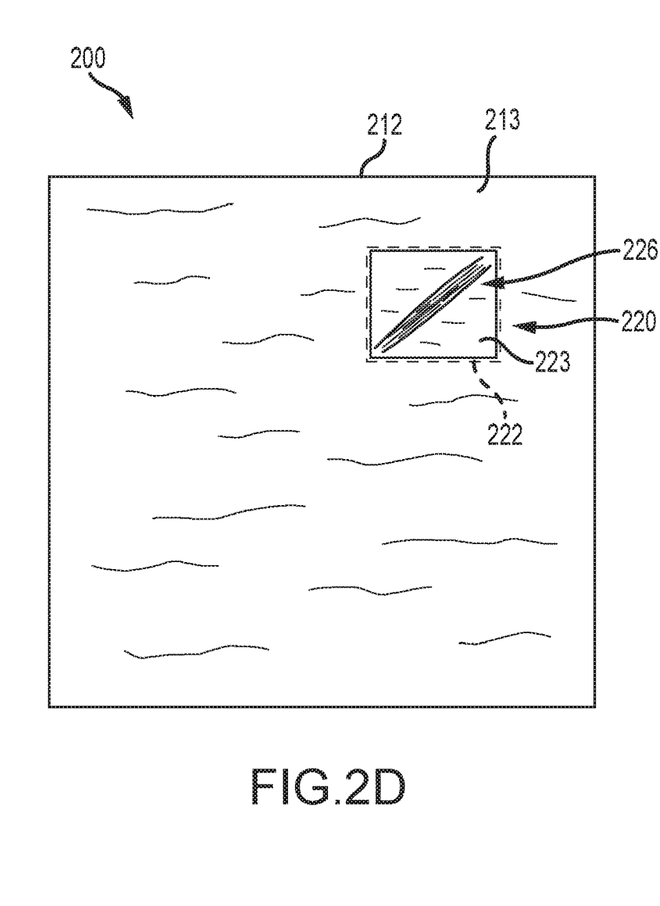

FIGS. 2C and 2D illustrate the display system 200 when it is operated in the first operating state (i.e., with the switchable optical element "off" to block light) and when it is operated in the second operating state (i.e., with the switchable optical element 220 "on" or activated to allow light to pass through the pane/film 222), respectfully. In the exemplary embodiment of system 200 shown, the display system 200 was adapted to transform an exterior surface of a wall (such as the exterior wall of a building) formed of concrete. Hence, the image layer 216 on exterior side/surface 213 of the foreground image element's substrate 212 is adapted to provide a finish/texture (or image or imagery) that matches that of a nearby support structure (not shown, but understood that the substrate 212 would be embedded in or mounted on a surface to be transformed).

When the display system 200 is operated (by a controller as discussed with reference to FIG. 1) in the first operating state as shown in FIG. 2C, the switchable optical element 220 is opaque or blocks light from reaching the background image element 226. As a result, light passes through the foreground image element 210 but is reflected from the pane/film's front surface 223 (which may cause the ink of image layer 216 adjacent to or covering the optical element 220 to be perceived by a viewer). As shown in FIG. 2D, though, when the display system 200 is operated in the second operating state, the switchable optical element 220 is clear or transparent (or substantially so) to light such that light from an exterior source passes through the foreground image element's substrate 212 and the pane/film 222 of the switchable optical element 220 and is reflected back from background image element 226, thereby transforming the texture/finish provided by image layer 216. In the prototyped display system 200, the inventor created a graphic with image element 226 that looked like a scorched burn mark on a concrete wall (e.g., as if the wall supporting the display system 200 had been struck by a laser blast). The illusion was visible in direct sunlight because the LC film 222 and print 226 provide a reflective effect and do not rely on projection.

Figure 3:
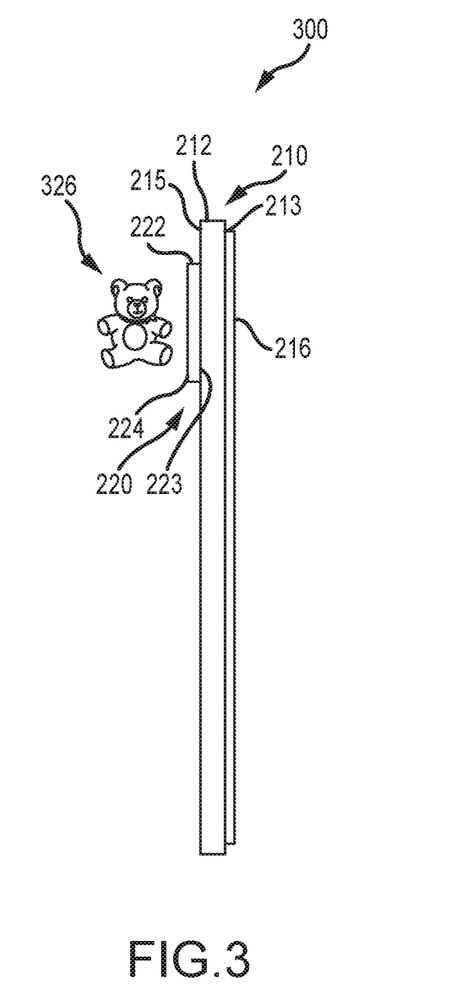
FIG. 3 illustrates another display system that is a modification of the display system of FIGS. 2A-2D to use a different background image element (e.g., a prop or 3D object)

FIG. 3 illustrates another useful display system 300 of the present description. The display system 300 utilizes similar components as system 200 of FIG. 2 including the switchable optical element 220, and these are labeled with matching reference numbers and the description provided for system 200 is applicable to system 300 for these components. The system 300 differs from system 200 in that the background image element 326 is shown to take the form of a 2D or 3D prop or object rather than a 2D print/bas relief as shown for element 226. The prop/object 326 is hidden from view when the system 300 is "off" and the switchable optical element 220 is opaque and is visible through the foreground image element 210 and element 220 when the system 300 is "on" (e.g., electric current is provided to the LC film/pane 222 of optical element 220).

Figure 4:
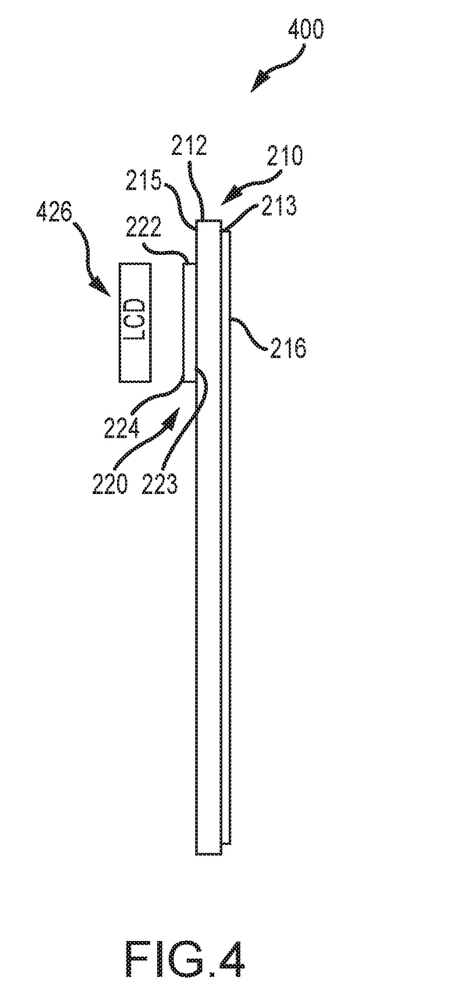
FIG. 4 illustrates another display system that is a modification of the display system of FIGS. 2A-2D to use a different background image element (e.g., a display device such as a daylight-visible LCD or the like)

FIG. 4 illustrates another useful display system 400 of the present description. The display system 400 utilizes similar components as system 200 of FIG. 2 including the switchable optical element 220, and these are labeled with matching reference numbers and the description provided for system 200 is applicable to system 300 for these components. The system 400 differs from system 200 in that the background image element 426 is shown to take the form of a display device rather than a 2D print/bas relief as shown for element 226. For example, the display device may take the form of a daylight-visible liquid crystal display (LCD) or the like that provides illumination levels (or output light levels) that are great enough to allow output imagery to be visible even in daylight or other high light applications/environments. The LCD or other display device 426 is hidden from view when the system 400 is "off" and the switchable optical element 220 is opaque and is visible through the foreground image element 210 and element 220 when the system 400 is "on" (e.g., electric current is provided to the LC film/pane 222 of optical element 220).

With the system 100 understood and the exemplary implementations of system 100 shown in FIGS. 2A-4 understood, it may be useful to illustrate a somewhat more complex embodiment of a display system that may be achieved with the concepts taught herein. As discussed earlier, the shape of the various components of a display system do not have to be limited to planar or flat. Also, two or more of the pairs of switchable optical elements and background image elements may be combined to achieve a desired effect rather than relying on just one pair of these two components.

Figure 5A:
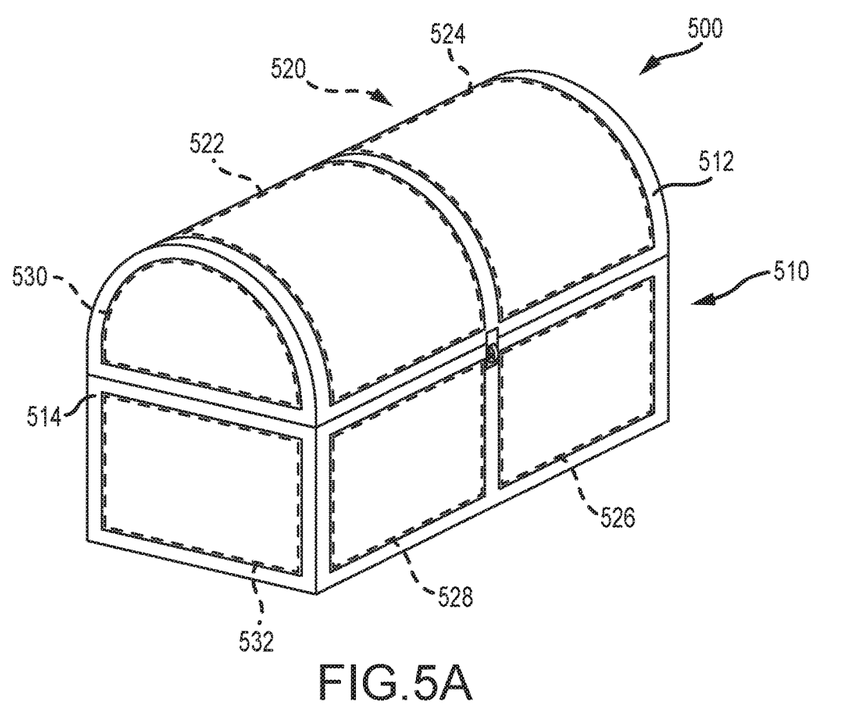
FIGS. 5A and 5B illustrate another exemplary display system of the present description in an "off" state (or first operating state) and in an "on" state (or second operating state).
Figure 5B:
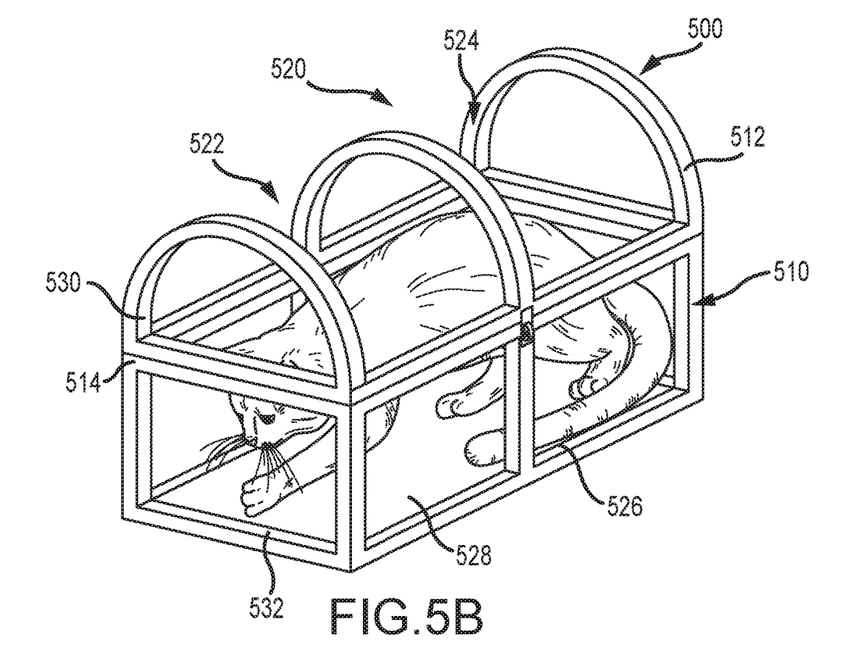

FIGS. 5A and 5B illustrate a display system 500 that is used to provide the effect of a chest in which a character is hiding and is later revealed through a magical transformation of the chest by operation of the display system 500. Particularly, the display system 500 is formed of a foreground image element 510 that includes a set or number (one-to-many) of transparent substrates upon which an image layer (e.g., transparent ink) has been applied to show a chest as shown at 512, 514 (e.g., a semi-circular substrate and image layer pair 512 combined with a planar end member (substrate and image layer pair) 514). When the display system 500 is operated in its first operating state as shown in FIG. 5A, a solid-walled chest is visible via reflected light from an exterior source (not shown but understood from FIG. 1) to a viewer. In the first operating state, all switchable optical elements are "off" (or not supplied electric current) such that their LC films/panes (or other material) are opaque.

Underneath or behind the foreground image element 510, an assembly 520 is provided that includes a plurality of pairs 522, 524, 526, 528, 530, 532 of switchable optical elements and background image elements (with these two components being understood and taking one of the forms discussed above with reference to FIGS. 1-4). When the display system 500 is operated in its second operating state, all of these optical elements are switched on or activated (e.g., electric current supplied to their LC films/panes) such that the switchable optical elements are transparent (or substantially transparent), which allows the underlying background image elements to be seen. This effect magically transforms the display system 500 from a solid chest hiding its contents to a chest with window-like portions that reveal the chest's contents such as a character (as shown) or other objects.

Hence, it can be seen that a display system of the present description can readily transform one-to-many surfaces in a synchronized manner (note, all the optical elements would not have to be activated concurrently but may be turned on/clear in any pattern desired by an effects designer) through the use of two or more of the switchable optical elements combined with a background image element.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

In some embodiments, the display system or assembly may be used as a switchable or active scrim. Conventional scrims are passive such that they are revealed when placed in higher illumination environments such as in an exterior setting where they are exposed to sunlight. In contrast, the new display system may be implemented with a sheet or pane of LC film that has its rear or inward facing (opposite the light source) surface printed upon or that has a transparent film that has been printed upon attached to its rear or inward facing surface. Then, electrical current can be switched to activate the scrim (show the printed image) or deactivate the scrim (to become opaque to block viewing of the printed image).

I claim:

1. A display system for transforming sunlit and other brightly lit surfaces, comprising:
   an optical element switchable between first and second operating states, wherein the optical element includes a pane that is substantially opaque in the first operating state and substantially transparent in the second operating state;
   a controller operable to switch the optical element between the first and second operating states;
   a background image element positioned adjacent to a first surface of the pane providing a background image; and
   a foreground image element positioned proximate to a second surface of the pane opposite the first surface of the pane, wherein the foreground image element comprises a transparent substrate with a first surface facing the second surface of the pane, wherein the foreground image element further comprises a second surface facing away from the pane, and wherein an image layer is applied to the second surface of the transparent substrate, whereby the background image is visible through the image layer, the transparent substrate, and the optical element when the optical element is operating in the second state.

2. The display system of claim 1, wherein the pane comprises a liquid crystal (LC) film and wherein the controller operates a power source to provide electric current to the LC film to switch the optical element to the second operating state.

3. The display system of claim 1, wherein the image layer of the foreground image element comprises transparent ink applied to or transparent or translucent paint painted onto the second surface of the transparent substrate.

4. The display system of claim 1, further including a support structure with an exposed surface and wherein the foreground image element is mounted on the support structure with the second surface of the transparent substrate coplanar with the exposed surface of the support structure.

5. The display system of claim 1, wherein the background image element comprises a printed graphic or bas relief on a substrate positioned to face the optical element.

6. The display system of claim 1, wherein the background image element comprises a layer of ink printed on or applied to the first surface of the pane.

7. The display system of claim 1, wherein the background image element comprises a daylight-viewable LC display.

8. A system, comprising:
   a sheet of LC film switchable between first and second operating states, wherein the LC film is opaque when operated in the first operating state and transparent when operated in the second operating state;
   a power source activated during the second operating state to provide electric current to the LC film;
   a background image element positioned adjacent a first side of the LC film; and
   a foreground image element positioned proximate to a second side of the LC film, wherein the background image element is visible through the foreground image element when the LC film is operated in the second operating state, wherein the foreground image element comprises a transparent substrate with a first surface facing the second side of the LC film and a second surface facing away from the LC film, and wherein an image layer is applied or attached to the second surface of the transparent substrate that displays a foreground image on ongoing basis via reflection of light striking the display system.

9. The system of claim 8, wherein the image layer of the foreground image element comprises transparent ink applied to or a transparent or translucent paint painted onto the second surface of the transparent substrate.

10. The system of claim 8, further including a support structure with an exposed surface and wherein the foreground image element is mounted on the support structure with the second surface of the transparent substrate substantially coplanar with the exposed surface of the support structure.

11. The system of claim 8, wherein the background image element comprises a printed graphic or bas relief on a substrate positioned to abut the first side of the LC film.

12. The system of claim 8, wherein the background image element comprises a layer of ink printed on or applied to the first side of the LC film.

13. The system of claim 8, wherein the background image element comprises a 2D or 3D object.

14. The system of claim 8, wherein the background image element comprises an emissive display device.

15. A display system for transforming sunlit and other brightly lit surfaces, comprising:
   an optical element switchable between first and second operating states, wherein the optical element comprises a sheet of LC material;
   a controller operable to switch the optical element between the first and second operating states by applying electric current to the sheet of LC material during the second operating state;
   a background image element positioned to face a first surface of the sheet of LC material; and
   a foreground image element positioned to face a second surface of the sheet of LC material,
   wherein the foreground image element comprises a transparent substrate with a first surface facing the second surface of the sheet of LC material and a second surface facing away from the sheet of LC material,
   wherein an image layer is applied or attached to the second surface of the transparent substrate, and
   wherein the image layer of the foreground image element comprises transparent ink or transparent or translucent paint applied to the second surface of the transparent substrate.

16. The display system of claim 15, wherein the background image element comprises one of a printed graphic or bas relief on a substrate positioned to face the optical element, a layer of ink printed on or applied to the first surface of the sheet of LC material, a 2D or 3D object, and a LCD device.

* * * * *